US 7,124,255 B2

(12) United States Patent
Nace et al.

(10) Patent No.: US 7,124,255 B2
(45) Date of Patent: Oct. 17, 2006

(54) MESSAGE BASED INTER-PROCESS FOR HIGH VOLUME DATA

(75) Inventors: Eric Nace, Fairbanks, AK (US); Kestutis Patiejunas, Sammamish, WA (US); Dario Bazan Bejarano, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 471 days.

(21) Appl. No.: 10/608,337

(22) Filed: Jun. 30, 2003

(65) Prior Publication Data
US 2004/0268363 A1 Dec. 30, 2004

(51) Int. Cl.
*G06F 12/00* (2006.01)
(52) U.S. Cl. .................. 711/147; 711/154; 711/202; 719/312
(58) Field of Classification Search ............. 711/147, 711/202, 154; 719/312
See application file for complete search history.

(56) References Cited

U.S. PATENT DOCUMENTS

| | | | |
|---|---|---|---|
| 6,341,338 B1* | 1/2002 | Dennie | 711/147 |
| 6,877,048 B1* | 4/2005 | Bilak et al. | 710/52 |
| 2002/0013889 A1* | 1/2002 | Schuster et al. | 711/203 |
| 2002/0053004 A1* | 5/2002 | Pong | 711/119 |
| 2002/0059503 A1* | 5/2002 | Dennie | 711/153 |
| 2003/0208660 A1* | 11/2003 | van de Waerdt | 711/137 |

OTHER PUBLICATIONS

Dice et al., "Mostly Lock-Free Malloc," pp. 163-174, ACM, Jun. 2002.*

* cited by examiner

Primary Examiner—Stephen C. Elmore
(74) Attorney, Agent, or Firm—Shook, Hardy & Bacon LLP (57) ABSTRACT

An interprocess communications platform enables individual processes to request and exchange data in a shared memory space, mediated by a communications engine. Processes, such as applications or other software running under an operating system or in a network, register to blocks of a shared memory space via an administrative memory space which tracks pointers, handles and other indicators of memory areas populated by individual processes. When one process requests access to a variable, pointer or other data generated by another process, the request is mediated by the communications engine. The communications engine may locate the target data belonging to the other process in the shared memory space, via a lookup of relative addressing in a separate administrative memory space. The communications engine, memory management objects and other resources may then lock the portion of the shared memory space allocated to the target process to permit the requesting process to access the data. Data may therefore be exchange between given processes while maintaining data integrity, and also may be cached in the shared memory space or elsewhere by the communications engine to further increase efficiency. Available memory in the shared memory space may be managed using the so-called buddy system or other heap or other management techniques. No named pipes or similar mechanisms under an operating system need be invoked.

23 Claims, 5 Drawing Sheets (PRIOR ART)

```
//this code registers the application using a unique identifying value and
//supplying a callback structure. Underneath the api creates the communication
//infrastructure and shared memory for caching
// this may only be done once within the application Dc.RegisterSMPQ(bAppReg, //app id
    &MessageCallBackHandler //callback functions
);

// this code creates a session with more or more remote computers. It sets the priority of the
//session, a debug string, timeouts and other various parameters
//a session can be created with N computers hr = Dc.CreateSession(&pSess, //out param that will receive the session object
    eSESSION_NORMAL_PRI, //session weighted priority
    FALSE, //have the infrastructure periodically check the session liveness
    L"3a047c3f-49da-4aa2-9ec9-a8dda18bc2b4",
    2500, //timeout for the session creation
    dwSReg, //
    dcRemoteComputerNameList, //list of computers, and their quotas
    1, //number of computer names in the RemoteComputerNameList
    &vcResponse //what happened when trying to create the session
);

//creates a message on a specific session
Dc.CreateMessage(reinterpret_cast<IMessage**>(&pMsg), pSess);

//set the data on the message
pMsg->SetData(pbData, dwDataSize);

//send the message; specifying timeout, unicast or multicast, synchronous or async
//One or more response will be received on the callback function if ASYNCHRONOUS
//is supplied during registration; otherwise the call blocks until a response is received
Dc.Send(pMsg, 250, unicast, SYNCHRONOUS, pResponseMsg);

delete pMsg;

//the message object can be recycled if the application wishes
//Sending a file (whether 1 byte or N gigabytes) is straightforward, chunking and multiplexing
//of data may be handled by the messaging system:
//this line of code registers the application using their unique identifying value and
//supplying a callback structure. Underneath the api creates the communication
//infrastructure and shared memory for caching
// this may only be done once within the application Dc.RegisterSMPQ(bAppReg, //app id
    &MessageCallBackHandler //callback functions
);

// this code creates a session with more or more remote computers. It sets the priority of the
//session, a debug string, timeouts and other various params
//a session can be created with N computers hr = Dc.CreateSession(&pSess, //out param that will receive the session object
    eSESSION_NORMAL_PRI, //session weighted priority
    FALSE, //have the infrastructure periodically check the session liveness
    L"3a047c3f-49da-4aa2-9ec9-a8dda18bc2b4",
    2500, //timeout for the session creation
    dwSReg, //
    dcRemoteComputerNameList, //list of computers, and their quotas
    1, //number of computer names in the RemoteComputerNameList
    &vcResponse //what happened when trying to create the session
);

//Create a file message instead of a normal message
Dc.CreateFileMessage(&pFileMsg,
    pSess,
    TRUE);

// build the file name of the source file
wcscpy(szFileName, L"c:\\TransferFrom\\trans");
wscat(szFileName, _itow(i, szBuffer, 10));
wscat(szFileName, L".txt");

//set the file name
pFileMsg->SetLocalPathAndFilename(szFileName);

//build the file name for the destination path (on a remote box)
wcscpy(szFileName, L"c:\\Transferto\\file");
wscat(szFileName, _itow(i, szBuffer, 10));

//set file name data (application can define and use any format it wishes)
//to send data pertinent for recreation on the remote process
pFileMsg->SetData(szFileName, (wcslen(szFileName) * 2), FALSE, FALSE);

//at this call the system will call back into the application asking
// for fixed sized chunks of data, using the messaging system
// to cache the data to go out through the communication channel.
Dc.Send(pFileMsg, INFINITE, unicast, SYNCHRONOUS, pResponseMsg);

delete pFileMsg;
```

FIG. 5

MESSAGE BASED INTER-PROCESS FOR HIGH VOLUME DATA

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention relates to the field of computing, and more particularly to software platforms designed to enable applications or other processes executing in a shared memory space to exchange data on an a secure and efficient basis.

BACKGROUND OF THE INVENTION

The task of permitting applications or other software processes to exchange or share data on a live basis represents a long-standing challenge in the field of computing science. Word processing, networking, database or data mining and other applications or other processes may need to operate or most optimally operate on a common data set. For instance, customer resource management (CRM) platforms of a corporation, government or other organization may benefit from enabling transaction data to be updated and synchronized after a customer service representative has updated an account via a call center workstation. Data mining applications may benefit from dynamic linkage to sales data or supply chain packages. Other software systems may benefit from dynamic data linkage.

However, under most operating systems the memory space of various application processes may typically be isolated from, and not by themselves equipped to exchange data with, each other. Permitting individual processes to access, operate on and store common data while maintaining data coherency and avoiding memory contention and other problems may be a non-trivial task. A network or other facility deploying distributed or otherwise interacting software may nevertheless have to provide some mechanism to exchange data on a dynamic basis.

Figure 1:
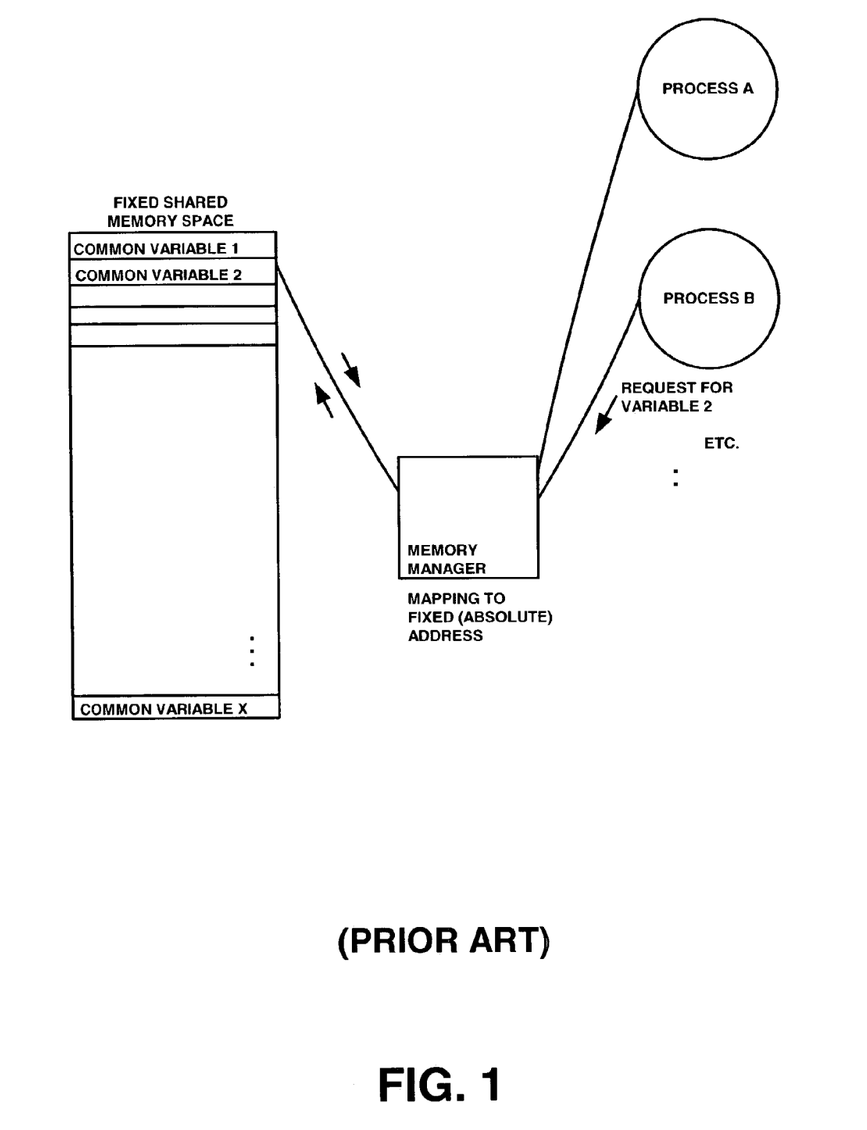
FIG. 1 illustrates a fixed shared memory scheme, according to a known architecture.

In certain known approaches, for instance the arrangement shown in FIG. 1, a fixed memory map may be configured to be shared by a set of processes, with variables from the various processes being mapped into that fixed space. Individual processes may then identify and operate on variables of interest. However, a static block approach may suffer from certain disadvantages. For one, the caching of any data or variable within a shared memory block can only be done by individual applications, increasing the coding complexity of those applications. Moreover, in network and other applications, the data being exchanged between various processes may differ widely in size, priority and other characteristics. For example, when a large number of processes attempt to access or manipulate another process, reliance upon a unified set of shared variables may prove inefficient or impossible. Timing, caching and other interactive complexities may degrade or overwhelm the system under such an approach as multiple processes contend for different variables or introduce dependencies or other problems.

Operating systems and other higher-level platforms have for their part afforded some solutions to the need for inter-process communication (IPC). For processes running under the Microsoft Windows™ NT, 2000 or related operating systems, for example, it is possible to open communication structures referred to as "pipes", which permit a public channel for communication between processes. However, difficulties or limitations may remain. For example, such pipes created at the operating system level may not persist after the participating processes terminate. Moreover while such pipes permit data to be communicated between processes, the data transmitted via the pipe does not persist after it is sent. Maintaining a cache or other structure may therefore be difficult or impossible. Moreover, when using named pipes the bandwidth required to transmit a given set of data may scale linearly with the size of the data, which may degrade the performance of video, database or other bandwidth-dependent processes. Other problems exist.

SUMMARY OF THE INVENTION

The invention overcoming these and other problems in the art relates in one regard to a system and method for interprocess communications, in which individual processes register a shared memory space on a dynamic basis. Processes may communicate with each other or with remote entities via the resulting effective data channel, with caching and other features supported by the shared memory scheme. Processes at start up may register a unique memory block to a memory manager in an administrative shared memory space. The memory manager in the administrative shared memory may use a heap management algorithm such as a buddy system or other allocation algorithm to allocate memory to processes. A communications engine may map a logical address for the memory block to physical memory within its address space on a dynamic basis. Because processes requesting data may begin to receive the data stream by redirection of a pointer or other memory locator to the assigned memory block, data channel transmission does not scale in transmission time or bandwidth according to the size of the data requested. The caching for the communications engine and other processes may be managed by memory managers in the administrative shared memory block as a byproduct of generic memory allocation. Because only the communications engine and a single other process will only ever share any one registered shared memory block and because data is managed in a coherent manner overall, the resulting communications platform as well as individual processes are consequently easier to debug, and the potential for memory corruption is reduced. Efficiency is increased because the amount of contention on any shared memory block is again reduced as there at most two processes vying for memory resources (as opposed to N processes and a single shared memory block as is commonly used) and each shared memory block is assigned its own memory manager in administrative shared memory. The invention may provide application programming interfaces (APIs) to create another level of data integrity since this may keep the communication engine or other process from writing directly to a shared memory block. An API may also allow processes to exchange data, but may not necessarily rely upon or execute at the operating system level of a host machine.

BRIEF DESCRIPTION OF THE DRAWINGS

The invention will be described in conjunction with the following drawings, in which like elements are labeled by like numerals and in which:

FIG. 3 illustrates an example of computer code which may implement calls to processes, according to an embodiment of the invention.

DETAILED DESCRIPTION OF EMBODIMENTS

Figure 2:
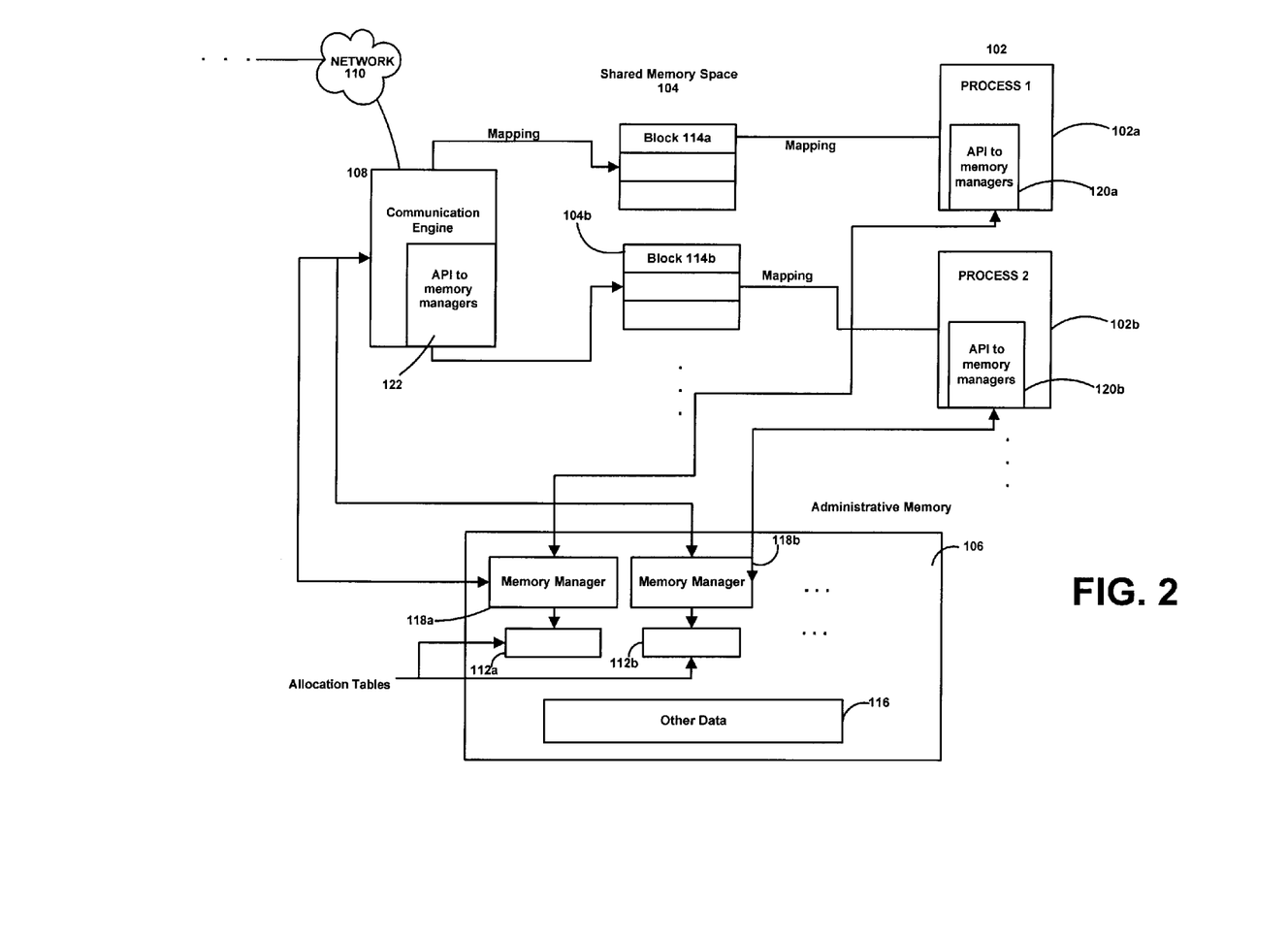
FIG. 2 illustrates an architecture in which interprocess communications may be supported, according to an embodiment of the invention.

FIG. 2 illustrates an architecture in which an interprocess communications platform according to an embodiment of the invention may operate. As shown in the illustrated embodiment, a shared memory space 104 may be accessed by a global set of processes 102a, 102b . . . containing an arbitrary number of software applications, threads, objects, modules, routines or other executing or executable processes. The shared memory space 104 may be or include the logical or physical memory space of a microprocessor or other logical or programmable device, or of a collection of clients or other resources, such as a network address space.

According to the illustrated embodiment, each process in the set of processes 102a, 102b . . . may have at least one memory block in a set of memory blocks 114a, 114b . . . uniquely assigned or mapped to it. The set of processes 102a, 102b . . . may also communicate with an administrative memory 106. In embodiments, the administrative memory 106 may reside in a named address block separate from shared memory space 104 or be otherwise protected to prevent overflows, overwrites or other corruption of the contents of administrative memory 106.

The architecture as shown may also include a communications engine 108 communicating with each process 102a, 102b . . . and corresponding memory block 114a, 114b . . . as well as with administrative memory 106. The communications engine 108 may also in embodiments as illustrated communicate with a network 110, which may be or include for instance, a local area network (LAN), wide area network (WAN), metropolitan area network (MAN), the Internet, or other local or remote network resources.

Communications engine 108 may in one regard mediate the exchange of data between any process in the set of processes 102a, 102b . . . with one or more other processes in the same global set of processes, with other processes or network requests located in or received from network 110, or with clients or entities elsewhere. Communications engine 108 may in embodiments be or include resources separate or independent from any underlying operating system under which the set of processes 102a, 102b may run. Communications engine 108 may coordinate and service interprocess communication requests on a dynamic basis, in conjunction with administrative shared memory 106, the shared memory space 104 and other resources. According to the invention in one regard, the communications engine 108 may generate the administrative memory 106 itself upon initiation or at other times.

When the administrative shared memory 106 is operating, communications engine 108 may configure and instantiate a set of memory management objects 118a, 118b . . . in the administrative memory 106. The set of memory management objects 118a, 118b . . . may execute in the context of communications engine 108 and/or the context of the set of processes 102a, 102b . . . to manage communications in and via the shared memory space 104. Communications engine 108 and the set of processes 102a, 102b . . . may dynamically allocate memory blocks 114a, 114b . . . or partitions of those blocks as needed through the set of memory managers 118a, 118b . . . in administrative memory 106. In embodiments, a unique memory manager from the set of memory managers 118a, 118b . . . may be assigned to each process in the set of processes 102a, 102b , . . . and/or to each memory block in the set of memory blocks 114a, 114b . . . , to reduce the chance of corruption and memory contention in the shared memory space 104.

When a process within the set of processes 102a, 102b . . . terminates on a planned or unplanned basis, the set of memory managers 118a, 118b and the remaining running processes in the set of processes 102a, 102b . . . may terminate access to and release the memory block or blocks within memory blocks 114a, 114b . . . which had been locked by the terminating process.

More specifically, when a given process in the set of processes 102a, 102b . . . is initiated, in embodiments that process may communicate with administrative memory 106 in a rendezvous or setup phase. During that phase, the requesting process within the set of processes 102a, 102b . . . may request the creation or allocation of a memory block within the set of memory blocks 114a, 114b . . . in the shared memory space 104. If the administrative memory space 106 is locked, full or otherwise unable to provide access, the requesting process in the set of processes 102a, 102b . . . may enter a wait state or otherwise delay the rendezvous process. When a block within shared memory space 104 becomes available, the requesting process may place a lock on that portion of shared memory space 104 to install or initiate a new memory block in the set of memory blocks 114a, 114b . . . . That newly allocated memory block in the set of memory blocks 114a, 114b . . . associated with the requesting process may be configured and managed by a unique memory manager in the set of memory managers 118a, 118b . . . resident in administrative memory 106.

Other data 116 related to the newly-generated shared memory block in the set of memory blocks 114a, 114b . . . may also be loaded into administrative memory 106, which data may include for instance file handles, variables, address offset or other memory mapping data and other information related to the requesting process in the set of processes 102a, 102b . . . and its corresponding memory block. When configuration is complete, the requesting process in the set of processes 102a, 102b . . . may communicate with and operate on its corresponding memory block in the set of memory blocks 114a, 114b . . . to read and write data, such as variables, arrays, tables or other content.

In general, because other data 116 such as file handles, variables, memory mapping and other data for each process in the set of processes 102a, 102b . . . is published or available in administrative memory 106, processes in the set of processes 102a, 102b . . . or others may generate a session to communicate with each other via the shared memory 104, mediated by communications engine 108.

The communications engine 108 may or may not register its own shared memory block, but may typically request that the set of memory managers 118*a*, 188*b* . . . in administrative memory 106 dynamically grow or contract memory blocks within the set of memory blocks 114*a*, 114*b* . . . on a global basis depending on the demands and communication activity of active processes in the set of processes 102*a*, 102*b* . . . . Individual processes in the set of processes 102*a*, 102*b* . . . may themselves also dynamically grow or contract the memory blocks within the set of memory blocks 114*a*, 114*b* . . . registered to them based on communication needs.

Communications engine 108 may access and duplicate any files, handles, variables, memory mapping or other data from administrative shared memory 106 to support coherent communications between the set of processes 102*a*, 102*b* . . . or other resources. With access to address translation, memory mapping or other data for each process in the set of processes 102*a*, 102*b* . . . , the set of memory managers 118*a*, 118*b* . . . in administrative memory 106 may ensure coherency in the set of memory blocks 114*a*, 114*b* . . . . The communications engine 108 working with the set of memory managers 118*a*, 118*b* . . . in administrative memory 106 may reduce or manage dependencies between data or processes, as well as reduce memory contention or data corruption in the overall shared memory space 104.

Because individual processes in the set of processes 102*a*, 102*b* . . . are not required to attempt to synchronize memory activity but instead may rely upon session-based exchanges via communications engine 108 and the set of memory managers 118*a*, 118*b* . . . executing in administrative memory 106, the coding or testing requirements of those processes may be reduced.

The set of memory managers 118*a*, 118*b* in administrative memory 106 may provide an interface to the shared memory space 104 through various mechanisms, which may include for instance presenting APIs or dynamic link library (dll) hooks or other access points to the set of processes 102*a*, 102*b* . . . . Using those APIs, dlls or other interfaces, each process in the set of processes 102*a*, 102*b* . . . may generate a call to initiate a session with another process in the set of processes 102*a*, 102*b* . . . , with a process in network 110, or other local or remote processes as mediated through the communications engine 108.

An example of computer code generating a call to initiate a session is illustrated in FIG. 3. As shown in that figure, a message-based session may be initiated by a process in the set of processes 102*a*, 102*b* . . . or other entity via communications engine 108, administrative memory 106 and other resources. Although specific languages, routines or other code characteristics are illustrated, it will be appreciated that different types of code or instruction may be used.

Figure 4:
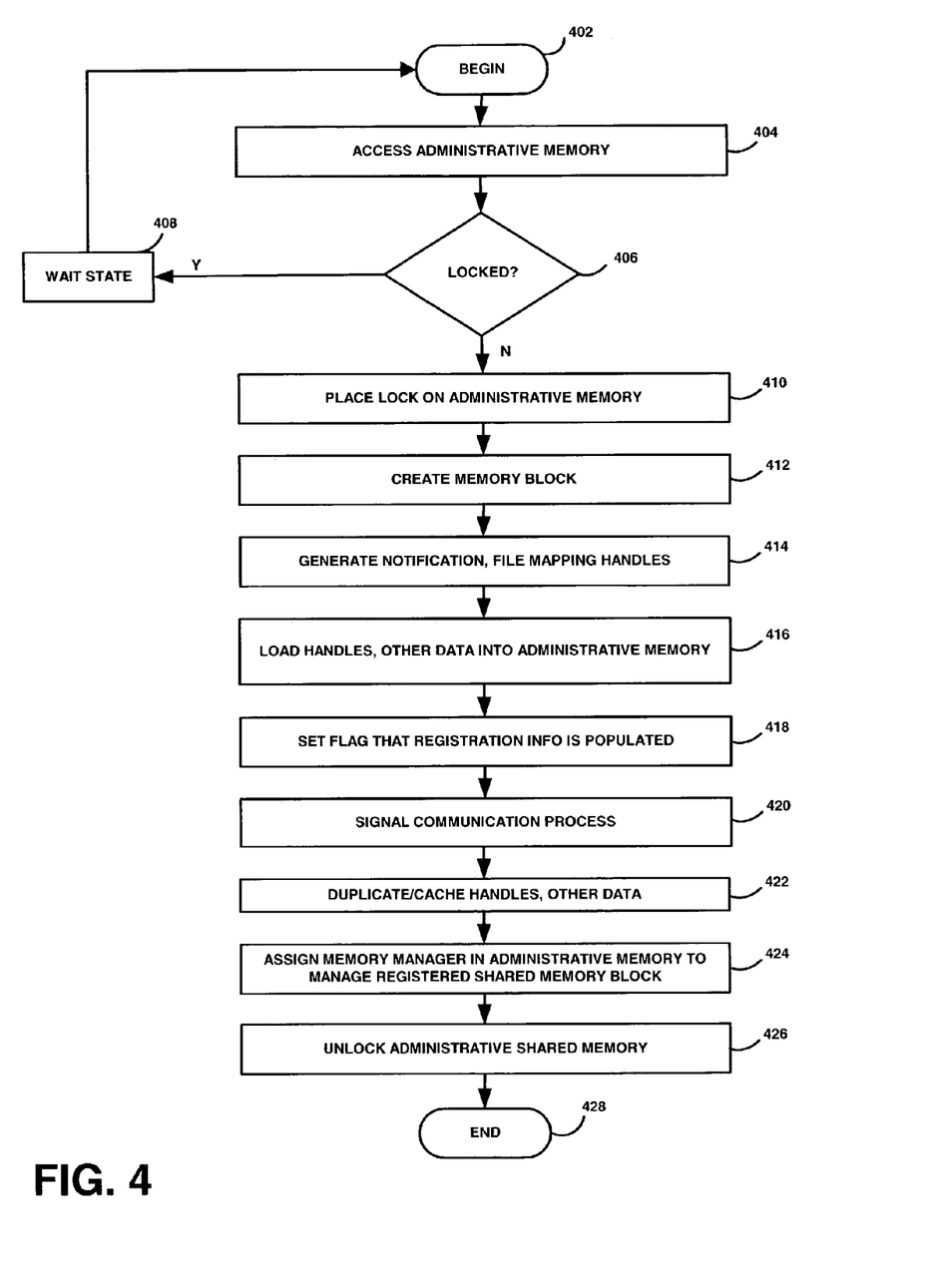
FIG. 4 illustrates a flowchart of a setup or rendezvous phase of overall interprocess communication, according to an embodiment of the invention.

Aspects of overall communications processing according to an embodiment of the invention is illustrated in FIG. 4, including a rendezvous or setup phase. In step 402, processing may begin. In step 404, the communications engine 108 or a process in the set of processes 102*a*, 102*b* . . . or other entity may initiate an attempt to access administrative memory 106. In step 406, a determination may be made whether administrative memory 106 is locked. If the administrative memory 106 is locked, processing may proceed to step 408, in which the process in the set of processes 102*a*, 102*b* . . . , communications engine 108 or other entity may enter a wait state, and then return to step 404.

If the determination in step 406 is that administrative 106 is not locked, in step 410 the process in the set of processes 102*a*, 102*b* . . . , communications engine 108 or other requesting entity may place a lock on the administrative memory 106 to register a block or other unit of memory. It may be noted in one regard that in embodiments, the API, dll or other interface into which the requesting process or other entity calls may support or perform some or all tasks described as being executed by that process or entity.

In step 412, a new or newly registered memory block within the set of memory blocks 114*a*, 114*b* . . . may be secured or generated (if not preexisting) by administrative memory 106 and other resources. In step 414, handles to notification events, such as file openings or others, variables and other data related to the newly generated memory block in the set of memory blocks 114*a*, 114*b* . . . and its associated process may be generated. In step 416, handles and other data associated with that process in the set of processes 102*a*, 102*b* . . . and the corresponding memory block may be loaded or stored in administrative shared memory 106.

In step 418, a flag may be set in administrative memory 106 or elsewhere that the new memory block in the set of memory blocks 114*a*, 114*b* . . . is registered. In step 420, the communications engine 108 may be signaled that the newly registered process in the set of processes 102*a*, 102*b* . . . may be available for interprocess communication.

In step 422, handles, variables and other data associated with the new memory block in the set of memory blocks 114*a*, 114*b* . . . may be cached or duplicated by communications engine 108 or other resources. In step 424, a memory manager in the set of memory management objects 118*a*, 118*b* . . . may be assigned to the newly generated memory block within the set of memory blocks 114*a*, 114*b* . . . . In step 426, the administrative memory 106 may be unlocked. In step 428, processing may end, repeat, return to a prior point or take other action.

Figure 5:
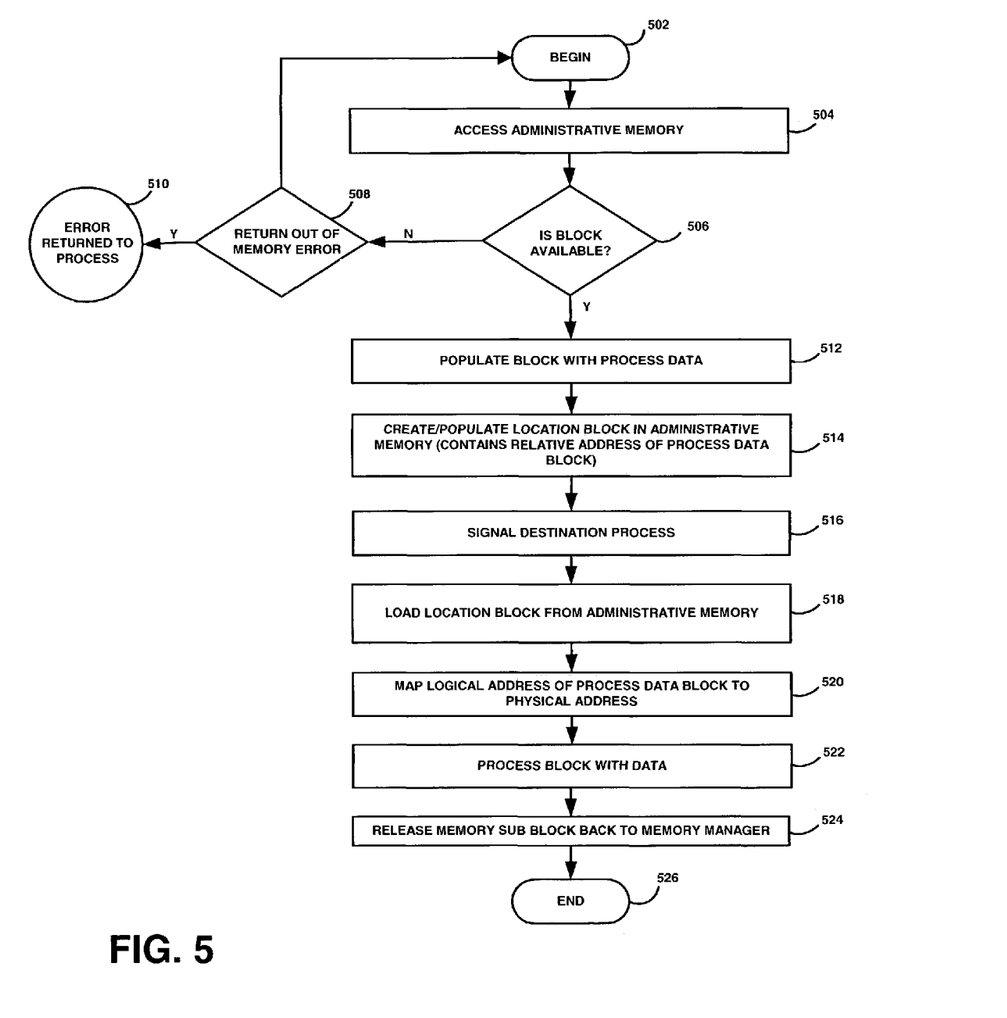
FIG. 5 illustrates a flowchart of a communications phase of overall interprocess communication, according to an embodiment of the invention.

Aspects of overall communications processing according to an embodiment of the invention is illustrated in FIG. 5, including process-to-process communications and other actions. In step 502, processing may begin. In step 504, the communications engine 108, a process in the set of processes 102*a*, 102*b* . . . or another entity may request a memory block or sub-block from one of the memory management objects in the set of memory management objects 118*a*, 118*b* . . . to effectuate a communications channel. In step 506, a determination may be made whether one or more memory block or sub-block in the set of memory blocks 114*a*, 114*b* . . . is available. If the determination in step 506 is that there is no memory block or sub-block available, processing may proceed to step 508 in which an out of memory error may be returned to communications engine 108 process or elsewhere. In step 510, an error message may likewise be communicated to the initiating process or elsewhere.

If the determination in step 506 is that a memory block or sub-block is available, processing may proceed to step 512 in which the initiating process, communications engine 108 or other entity may populate that open block or sub-block with data to be communicated to a destination process. In step 514, the initiating process, communications engine 108 or other entity may generate or populate a location memory block within administrative memory 106, which may be or include a memory block recording the relative address of the block or sub-block which has been populated with process data to be transferred.

In step 516, the communications engine 108 may signal the destination process that a communications event has been requested. In step 518, the communications engine 108, destination process or other entity may load the location memory block in administrative memory 106. It may be noted in one regard that in embodiments, the API, dll or other interface into which the requesting or destination process or other entity calls may support or perform some or all tasks described as being executed by that process or entity. In embodiments, the API, dll or other interfaces may for example interface with the set of memory management objects 118a, 118b . . . in administrative memory 106 to effectuate various memory and communications tasks.

In step 520, the logical address of the block or sub-block which has been populated with process source data to be transferred may be mapped to a physical memory address within address space 104. In step 522, the communications engine 108, initiating process or other entity may process the data contained within the block or sub-block populated with source data, for instance to read or copy that data or a portion thereof. In step 524, the block or sub-block populated with source data may be released back to the corresponding memory management object within the set of memory management objects 118a, 188b . . . . In step 526, processing may end, repeat, return to a prior point or take other action.

According to embodiments of the invention, communications engine 108, set of memory management objects 118a, 118b . . . and other resources may assign each memory block in the set of memory blocks 114a, 114b . . . to a logical or physical address based on, for example, a structured allocation mechanism, such as a buddy system algorithm or other strict segregated fit or other technique. Buddy system algorithms may for example in embodiments be employed in which a given memory block in the set of memory blocks 114a, 114b . . . may receive an assignment of one or both of two adjacent memory segments when a process requests new memory, or at other times. In embodiments a memory request by a process in the set of processes 114a, 114b . . . may be rounded up to the next available size, such as 2 kilobytes, 4 kilobytes, or other sized segments or blocks.

When a memory block with the set of memory blocks 114a, 114b . . . or a segment thereof is released, the buddy of that block may be efficiently recaptured as well, by computation of the offset or other known relation to its associated buddy block or segment. Conversely, when an executing process, terminates and releases a block or blocks, or a portion thereof, of the set of memory blocks 114a, 114b . . . , paired adjacent segments or blocks may be coalesced and returned to an available status within the memory pool managed in the set of memory allocation tables 112a, 112b . . . . Other memory management techniques or enhancements, such as look-aside tables or other techniques, may also be used. The distribution of memory to each process in the set of processes 102a, 102b . . . may done on a dynamic basis, so that memory blocks or the overall memory allocation for each process in the set of processes 102a, 102b . . . may grow or shrink over time. Allocation and reallocation of memory in the shared memory space 104 may be triggered by different criteria or events, such as requests or releases by other processes in the set of processes 102a, 102b, . . . data accesses by external clients, memory overflow or error conditions, or other events or factors.

According to the interprocess communications architecture of the invention in one regard, an individual process in the set of processes 102a, 102b . . . may consequently not be able to gain direct access to the memory block of another process, but instead may only access blocks belonging to another process via administrative memory 106, the set of memory manages 118a, 118b . . . , communications engine 108 and other resources. Direct access to other memory blocks would introduce a security risk as well as increase the complexity of the communications infrastructure, since direct contention between processes could ensue. A direct access scheme would likewise reduce system stability and reduce performance, since a write lock condition on a memory block could occur and serialization of access would then be required.

According to embodiments of the invention, when an individual process in the set of processes 102a, 102b . . . desires to initiate communication with another process, that initiating process may create a communications session with that process, for instance by transmitting a message to that destination process. That initiation message may be copied into the memory block of the destination process via communications engine 108 and other resources. In the instance where both the initiating and destination processes are located on the same client machine or other shared resource, interprocess communications may be executed via memory-to-memory copies, which may be a particularly efficient channel.

According to the invention in another regard, overall memory contention may be significantly reduced, since only two processes may contend for memory lock on one of the set of memory blocks 114a, 114b . . . at the same time. More specifically, while a given process may contend with communications engine 108 for access to its associated memory block in the set of memory blocks 114a, 114b . . . at the same time, and while another process may contend with communications engine 108 for access to that memory block as a destination, in general two processes in the set of processes 102a, 102b . . . themselves never contend for access to the same memory block in the set of memory blocks 114a, 114b . . . at the same time. Communication efficiency is therefore enhanced.

The foregoing description of the invention is illustrative, and modifications in configuration and implementation will occur to persons skilled in the art. For instance, while the invention has generally been described in terms of a single or unitary shared memory space, in embodiments multiple shared memory spaces may be accessed or managed, together or independently. Processes accessing those one or more shared memory spaces may each be local to one client or other machine, distributed across a local area network or other network, or communicate remotely, for instance via the Internet, depending on implementation.

Similarly, while the invention has generally been describe in terms of a unitary communications engine 108 interacting with a set of memory management objects 118a, 118b, . . . , in embodiments one or more parts of the communications functions may be executed or distributed in different modules, machines or network locations. While generally illustrated as a singular or contiguous memory space, the administrative shared memory space 106 in which address translation and other data may be stored may likewise be divided or multiple, as long as logical separation from the shared memory space of executing processes is maintained. The shared memory space 104 in which active processes likewise in embodiments likewise need not be contiguous, or need not be all in the same electronic or other form. Other hardware, software or other resources described as singular may in embodiments be distributed, and similarly in embodiments resources described as distributed may be combined. The scope of the invention is accordingly intended to be limited only by the following claims.

We claim:

1. A method for managing communication between processes, comprising:

assigning at least one memory block from a set of memory blocks to each of a plurality of processes; and directing a data access request from at least one of the plurality of processes to the at least one corresponding assigned memory block based on memory management data; and storing the memory management data in at least an administrative memory, the administrative memory being separate from a shared memory space.

2. A method according to claim 1, further comprising a step of each processes registering their at least one assigned memory block in the set of memory blocks in the administrative memory.

3. A method according to claim 1, wherein the memory management data comprises a plurality of memory management objects associated with the plurality of processes.

4. A method according to claim 3, wherein each memory management object is uniquely associated with one of the plurality of processes.

5. A method system according to claim 1, wherein the set of memory blocks comprises a first memory address space.

6. A method according to claim 5, wherein the administrative memory comprises a second memory address space.

7. A method according to claim 1, further comprising a step of modifying the data in at least one assigned memory block according to the data access request.

8. A method according to claim 1, further comprising a step of returning data from at least one assigned memory block according to the data access request.

9. A method according to claim 8, further comprising a step of parsing at least one of the data access request and the returned data.

10. A method according to claim 1, further comprising a step of executing a cache module, the cache module maintaining a cache of data exchanged between the set of memory blocks.

11. A method according to claim 1, further comprising a step of assigning the at least one memory block to each process based on a buddy system allocation.

12. A method according to claim 1, further comprising a step of terminating a connection to the set of memory blocks after completion of the data access request.

13. A method according to claim 1, wherein the step of assigning at least one memory block to each of the plurality of processes comprises a step of dynamically assigning at least one memory to each of the plurality of processes.

14. A method according to claim 1, further comprising a step of copying data in one memory block to another memory block.

15. A method according to claim 1, further comprising a step of transmitting data from one memory block to a remote destination process.

16. A method according to claim 15, wherein the step of transmitting data comprises a step of transmitting data via an external network to the destination process.

17. A method for managing communication between processes, comprising:
assigning at least one memory block from a set of memory blocks to each of a plurality of processes;
directing a data access request from at least one of the plurality of processes to the at least one corresponding assigned memory block based on memory management data; and
modifying data in at least one assigned memory block according to the data access request.

18. A method for managing communication between processes, comprising:
assigning at least one memory block from a set of memory blocks to each of a plurality of processes;
directing a data access request from at least one of the plurality of processes to the at least one corresponding assigned memory block based on memory management data; and
executing a cache module, the cache module maintaining a cache of data exchanged between the set of memory blocks.

19. A method for managing communication between processes, comprising:
assigning at least one memory block from a set of memory blocks to each of a plurality of processes;
directing a data access request from at least one of the plurality of processes to the at least one corresponding assigned memory block based on memory management data; and
assigning the at least one memory block to each process based on a buddy system allocation.

20. A method for managing communication between processes, comprising:
assigning at least one memory block from a set of memory blocks to each of a plurality of processes;
directing a data access request from at least one of the plurality of processes to the at least one corresponding assigned memory block based on memory management data; and
terminating a connection to the set of memory blocks after completion of the data access request.

21. A method for managing communication between processes, comprising:
assigning at least one memory block from a set of memory blocks to each of a plurality of processes, wherein the step of assigning the at least one memory block comprises a step of dynamically assigning at least one memory block to each of the plurality of processes; and
directing a data access request from at least one of the plurality of processes to the at least one corresponding assigned memory block based on memory management data.

22. A method for managing communication between processes, comprising:
assigning at least one memory block from a set of memory blocks to each of a plurality of processes;
directing a data access request from at least one of the plurality of processes to the at least one corresponding assigned memory block based on memory management data; and
copying data in one memory block to another memory block.

23. A method for managing communication between processes, comprising:
assigning at least one memory block from a set of memory blocks to each of a plurality of processes;
directing a data access request from at least one of the plurality of processes to the at least one corresponding assigned memory block based on memory management data; and
transmitting data from one memory block to a remote destination process.

* * * * *